United States Patent [19]

Banner et al.

[11] Patent Number: 4,915,313

[45] Date of Patent: Apr. 10, 1990

[54] ARMATURE WINDING MACHINE WITH QUICK-CHANGE TOOLING

[75] Inventors: Alvin C. Banner, Kettering; Philip C. Morgan, New Paris; Ballard E. Walton, Dayton, all of Ohio

[73] Assignee: Globe Products Inc., Dayton, Ohio

[21] Appl. No.: 125,289

[22] Filed: Nov. 25, 1987

[51] Int. Cl.[4] .............................................. H02K 15/09
[52] U.S. Cl. .............................................. 242/7.05 B
[58] Field of Search ...................... 242/7.05 R, 7.05 A, 242/7.05 B, 7.05 C

[56] References Cited

U.S. PATENT DOCUMENTS

| | | |
|---|---|---|
| Re. 27,893 | 1/1974 | Miller . |
| 882,253 | 3/1908 | Kunkel . |
| 2,144,477 | 1/1939 | Abrams . |
| 2,348,948 | 5/1944 | Allen . |
| 2,969,195 | 1/1961 | Leithe . |
| 3,345,002 | 10/1967 | Peters . |
| 3,673,878 | 7/1972 | Biddison ................. 242/7.05 B X |
| 3,785,583 | 1/1974 | Biddison ................. 242/7.05 B |
| 3,927,843 | 12/1975 | Dammar ................. 242/7.05 B |
| 4,459,742 | 7/1984 | Banner ................. 242/7.05 B X |
| 4,708,297 | 11/1987 | Boers ................. 242/7.05 B |
| 4,786,004 | 11/1988 | Boers ................. 242/7.05 B |

OTHER PUBLICATIONS

Sketch of prior art for purposes of supplemental information dislcosure statement, no date available.

*Primary Examiner*—Stuart S. Levy
*Assistant Examiner*—Katherine Matecki
*Attorney, Agent, or Firm*—Roger S. Dybvig

[57] ABSTRACT

Both the inner commutator shield assembly and the outer commutator shield assembly of a flier-type armature winding machine include quick release means by which armature-specific tooling parts may be quickly removed and replaced by other armature-specific tooling. The armature rotator assembly has a modular collet assembly which may be removed simply by manually removing a pair of connectors and replaced by another modular collet assembly. By employing these assemblies, an entire tooling changeover can be effected by one relatively unskilled in tooling set-up techniques in a few minutes without the use of tools.

14 Claims, 3 Drawing Sheets

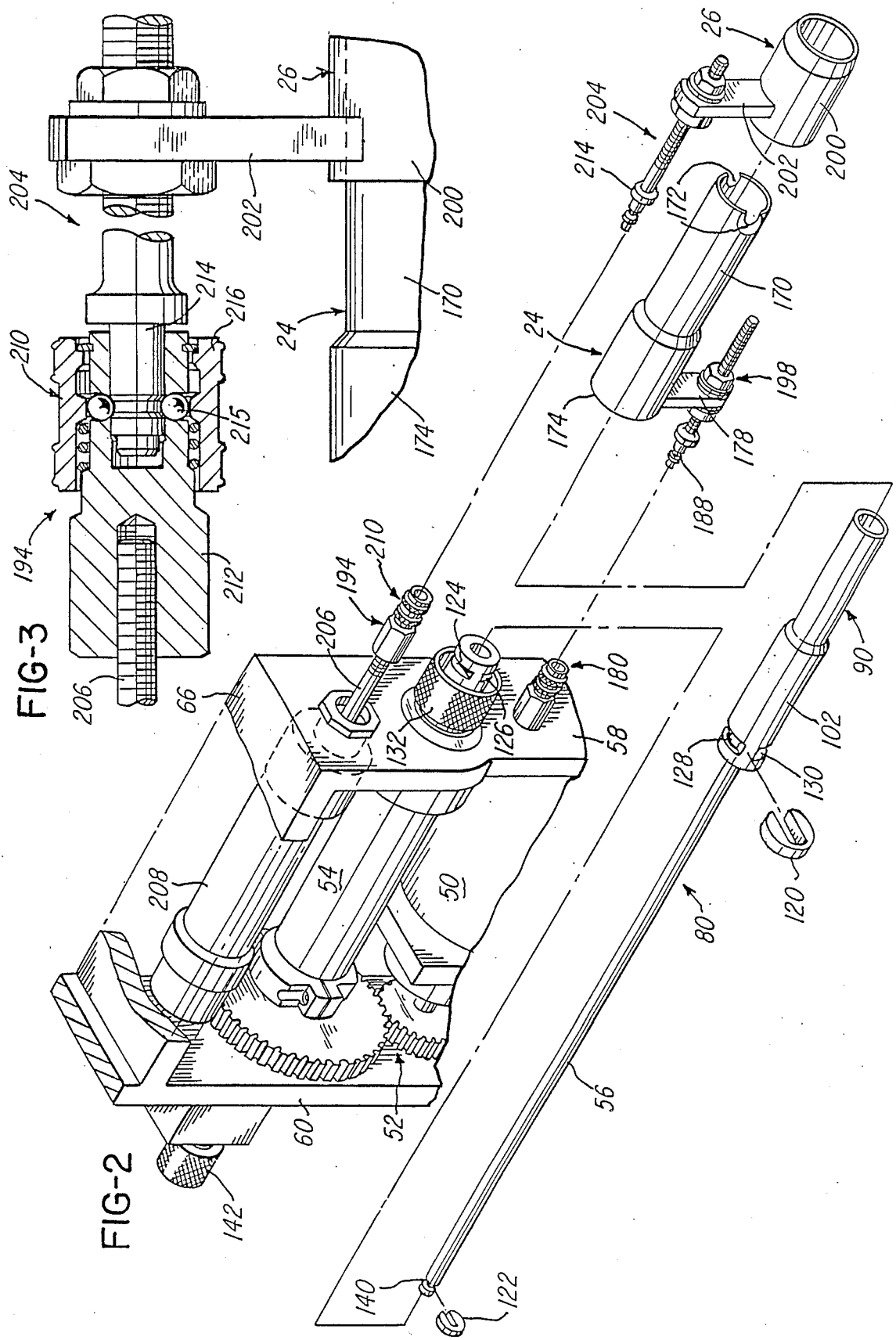

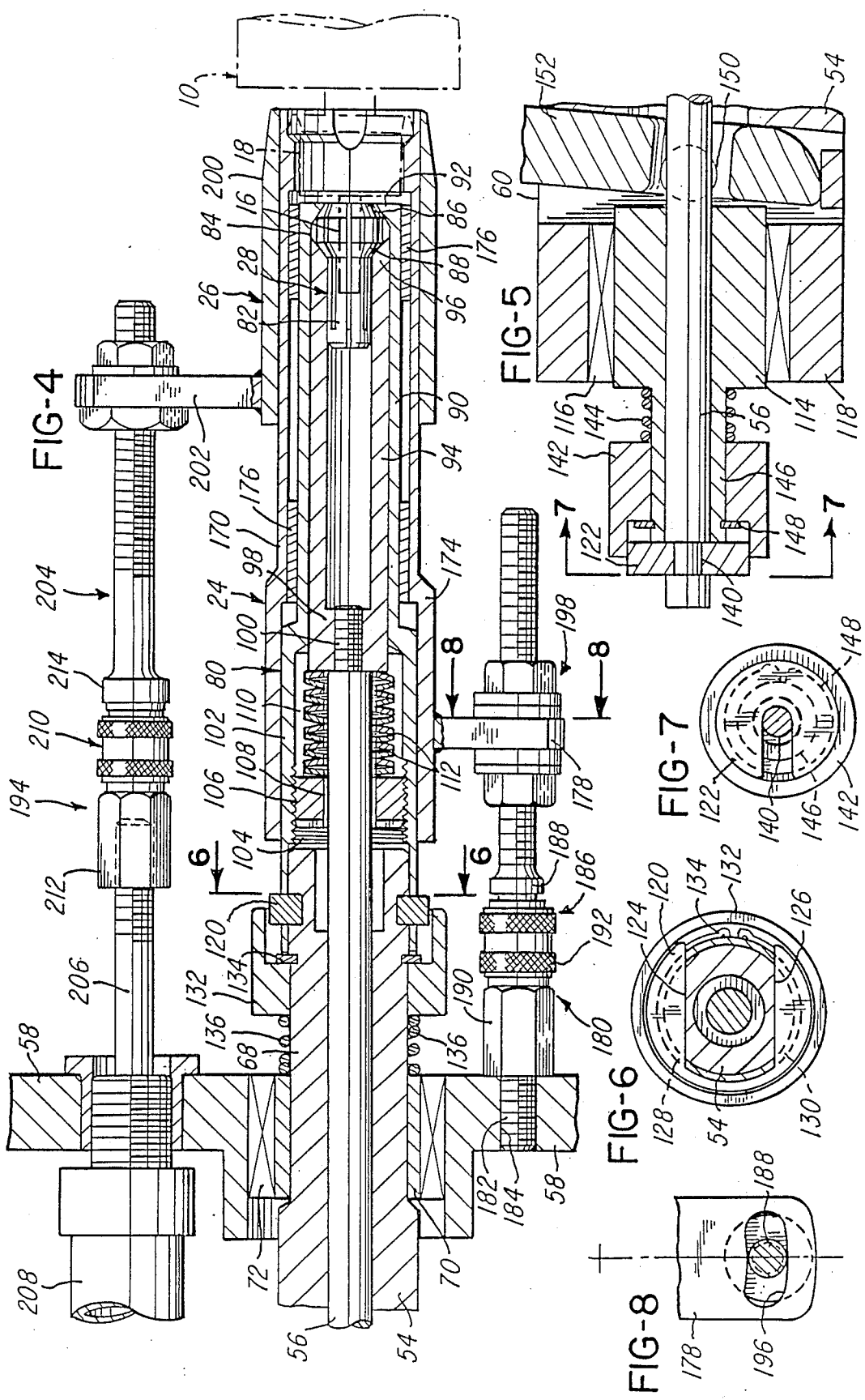

ARMATURE WINDING MACHINE WITH QUICK-CHANGE TOOLING

SUMMARY OF THE INVENTION

This invention relates to an armature winding machine with quick-change tooling, especially armature-specific tooling for flier-type winding machines. The tooling of this invention is intended primarily for use with double flier winding machines that are most generally used for winding armatures and are typically called "armature winders" but may also be used to wind other cores having radially outwardly opening slots, such as rotating cores carrying field coils. As will become apparent to those skilled in the art, the invention is not so limited and may be used with single or triple flier machines and other types of winding equipment utilizing one or more winding forms.

Typical flier-type armature winding machines used for high-speed production are essentially "dedicated" in the sense that each machine is tooled to wind but a single configuration of armature, or at best a very limited number of armatures. To reliably make lead-wire connections to the commutators of armatures to be wound and to wind acceptable coils, the machine tooling parts must normally be carefully machined to be armature-specific, i.e. dedicated to be used with a single armature of a given configuration, or no more than a very limited number of different configurations. To change over from a conventional winding form assembly configured for use in winding one armature to another winding form assembly for winding a different armature usually requires at least several minutes time and typically requires a service representative of the armature winding machine manufacturer or a specially-trained set-up man who is capable of effecting the changeover.

State-of-the-art double flier machines are entirely satisfactory for most winding applications. However, there are increasing demands upon armature winding machine manufacturers to provide machines that can be rapidly changed over from the capability of producing an armature having one set of parameters to producing an armature having a different set of parameters.

An object of this invention is to provide a flier-type armature winding machine that may be easily and quickly changed over from being tooled to wind armatures having one set of parameters to an armature having a different set of parameters. More particularly, this invention is directed to an improved armature rotator with an armature-gripping collet assembly and to an improved commutator shield tooling assembly wherein the armature-specific parts thereof may be quickly and easily removed and then quickly and easily replaced by other armature-specific parts by a person having little experience in tooling set-up techniques. This enables the machine manufacturer to produce replacement sets of armature-specific tooling parts so that a single armature winding machine may be used to produce armatures having various different configurations with minimal changeover time.

In accordance with this invention, both the inner shield assembly and the outer shield assembly include quick release means by which the armature-specific tooling parts may be quickly removed and replaced by other armature-specific tooling. The armature rotator assembly has a modular collet assembly which may be removed simply by manually removing a pair of connectors and replaced by another modular collet assembly. An entire tooling changeover can thus be effected by one relatively unskilled in tooling set-up techniques in a few minutes without the use of any special tools.

Other objects and advantages will become apparent from the following description and the drawings.

BRIEF DESCRIPTION OF THE DRAWINGS

FIG. 2 is a fragmentary perspective view with parts exploded away of a portion of the machine of FIG. 1 and on a slightly larger scale then FIG. 1. Parts have been removed to better show other parts.

FIG. 3 is an enlarged, fragmentary side elevational view, with parts in cross section, taken substantially on line 3—3 of FIG. 1.

FIG. 4 is an enlarged, fragmentary cross-sectional view of a portion of the machine of FIG. 1, and shows, in phantom, a portion of the armature.

FIG. 5 is an enlarged, fragmentary cross-sectional view of another portion of the machine of FIG. 1.

FIG. 6 is a cross-sectional view taken along line 6—6 of FIG. 4.

FIG. 7 is a cross-sectional view taken along line 7—7 of FIG. 5.

FIG. 8 is a fragmentary cross-sectional view taken along line 8—8 of FIG. 4.

DETAILED DESCRIPTION

Figure 1:
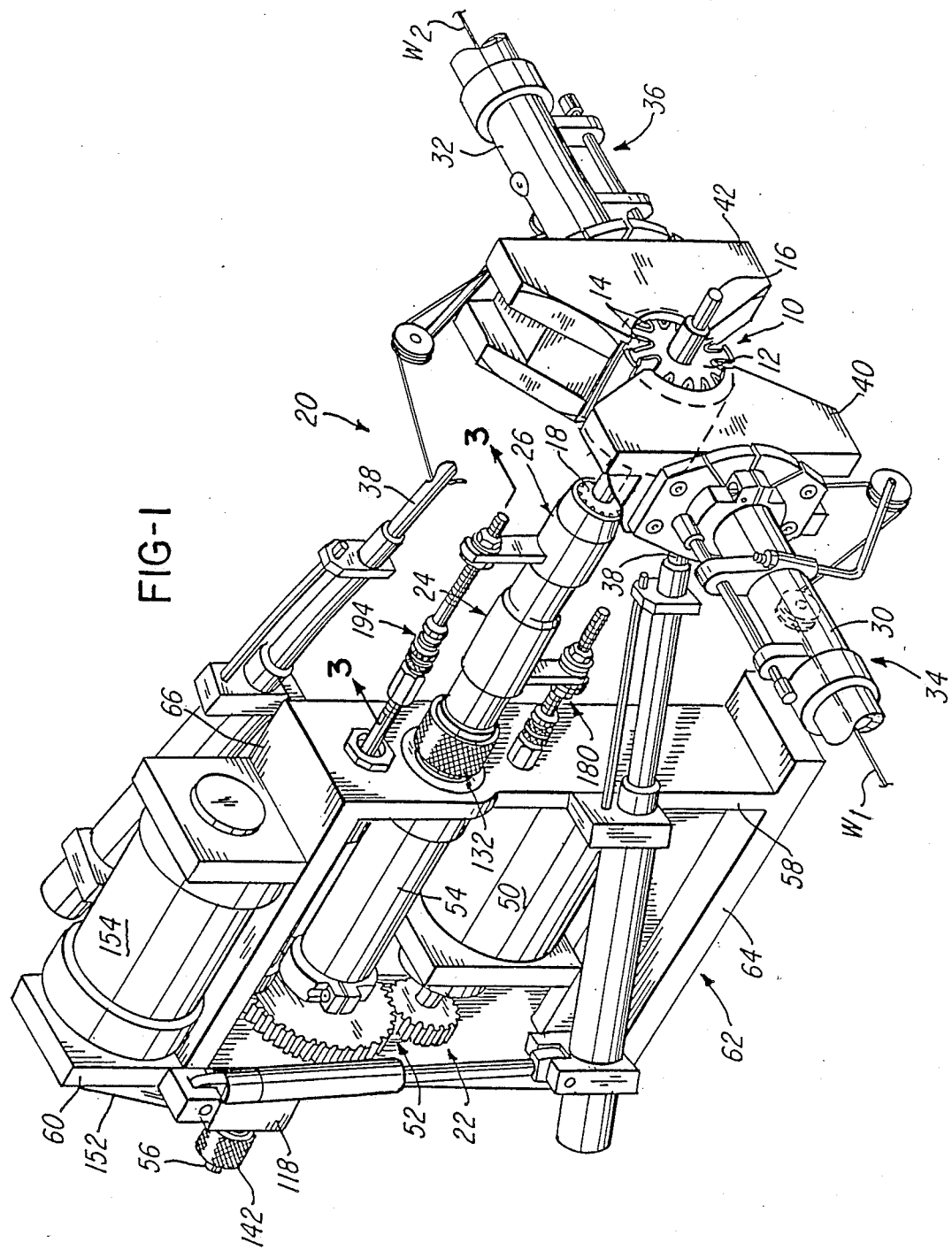
FIG. 1 is a simplified, fragmentary perspective view of a portion of a double flier armature winding machine provided with quick-change tooling made in accordance with this invention, and also shows a portion of an armature to be wound.

Referring to FIG. 1, this invention is shown in connection with the winding of an armature, generally designated 10, including an armature core 12 having radially inwardly directed coil-receiving slots 14 mounted on an armature shaft 16. A commutator 18 having plural tangs is mounted upon the same shaft 16. Armature 10 is merely one example of many armatures that may be wound by a flier-type winder.

A portion of a double flier armature winding machine, generally designated 20, used for winding the armature 10 is shown in FIG. 1. Only a limited portion of the machine 20 is illustrated because most of the details of construction of the machine 20 may be entirely conventional and are not part of this invention. Briefly, machine 20 includes an armature rotator assembly, generally designated 22, with which are associated commutator shield mechanisms comprising an inner shield assembly, generally designated 24, and an outer shield assembly, generally designated 26. The purpose of the armature rotator assembly 22 is to position the armature 10 as required to effect the winding of coils thereon and the connection of coil leads to the commutator 18, and the armature rotator assembly 24 has a collet 28 (FIG. 4) for gripping the commutator end of the armature shaft 16. Examples of prior armature winding machines having armature rotators with collets and commutator shields are shown in U.S. Pat. No. 3,673,878, issued to John M. Biddison on July 4, 1972, and in U.S. Pat. No. 4,633,577, issued to Alvin C. Banner on Jan. 6, 1987. As will become apparent from the discussion that follows, this invention is directed to improvements in the armature rotator assembly 22 and in the commutator shield assemblies 24 and 26.

The armature winding machine 20 further includes left and right side flier spindles 30 and 32, respectively, through which wires, designated $W_1$ and $W_2$, respectively, extend from suitable sources (not shown) of wire under tension. The wires $W_1$ and $W_2$ exit from flier assemblies 34 and 36, respectively, to the armature 10. A pair of pivotal wire clamp assemblies 38 clamp the free ends of the wires at the end of the winding of one armature until after the commencement of the winding of the next armature. As is well known, during the winding of the armature the flier spindles 30 and 32 are rotatably driven in mutually opposite directions by a suitable motor drive assembly and control circuitry therefor during which time the wires $W_1$ and $W_2$ are drawn through the flier spindles 30 and 32 and wound into the core slots 14. During the winding operations, the wires are guided into the core slots 14 by left and right side winding form assemblies 40 and 42.

This invention could be practiced with armature winding machines having any of various types of winding forms. However, this invention is preferably used with other armature-specific tooling devices which can be rapidly changed to accommodate different armatures. Winding form assemblies that may be quickly changed are disclosed in a copending U.S. application Ser. No. 125,288 of Ballard E. Walton, George A. Gouldbourn, and Alvin C. Banner, titled WINDING FORM ASSEMBLY, filed in the United States Patent and Trademark Office on Nov. 25, 1987.

With reference to FIGS. 1, 2, 4, and 5, the armature rotator assembly 22 comprises a stepping motor 50 which, through gears 52, drives a rotator spindle 54 that is hollow to receive a collet release rod 56. The rotator spindle 54 and the collet release rod 56 are appropriately mounted for rotation within front and rear frame plates 58 and 60, respectively, of a rotator support frame, generally designated 62, including a frame base plate 64, and a frame top plate 66. The rotator spindle 54 has a reduced diameter front portion 68 extending through the inner race 70 of a bearing 72 in the front frame plate 58.

Referring to FIGS. 2, 4, and 5, the collet release rod 56 forms part of a readily removable, modular collet assembly, generally designated 80, which also comprises the aforementioned split collet 28. Split collet 28 includes an armature shaft-gripping, elongated, tubular body portion 82 and an enlarged head 84 having a front collet cam surface 86 and a rear collet cam surface 88. The modular collet assembly 80 further comprises a tubular collet retainer 90 having, at its front end, an inwardly directed flange 92 against which the front collet cam surface 86 bears. Coaxially received within the retainer 90 is a tubular collet actuator 94 having a front surface 96 that bears against the rear collet cam surface 88. The rearward end of the collet actuator 94 is closed by a rear wall 98 having a threaded bore to which the threaded forward end portion, designated 100, of the collet release rod 56 is threadedly connected.

Collet retainer 90 has an enlarged diameter rearward end portion 102 having, intermediate its ends, an internally threaded bore portion 104 to which a collet retainer end cap 106 is threadedly connected. End cap 106 has a central bore 108 through which the collet release rod extends. The actuator rear end wall 98 and the retainer end cap 106 define a chamber 110 within the enlarged diameter rear portion 102 of the retainer in which are located plural spring or Belleville washers 112.

Because the release rod 56 is threadedly connected to the end wall 98 of the actuator 94 and the end cap 106 is threadedly connected to the retainer 90, the collet assembly 80 comprises a unitary subassembly that may be replaced by other collet assemblies for use with armatures having different shaft, commutator, or core configurations.

Further in accordance with this invention, the collet assembly 80 is assembled with the other parts of the armature rotator 22 by simple, manually releasable means so that a relatively unskilled person may assemble and disassemble the collet assembly 80 on the machine 20 in minimal time. With reference to FIGS. 1, 2, 4, and 5, the collet assembly 80 may be connected to the rotator spindle 54 by first inserting the release rod 56 into the rotator spindle 54 from its front end 68 and extending it through the extreme rearward end of the rotator spindle 54 as shown in FIG. 5. When fully assembled, as shown in FIG. 4, the rearwardmost end of the enlarged rear end portion 102 of the collet retainer 90 is slipped over the forwardmost end of the reduced diameter forward portion 68 of the rotator spindle 54. At the same time, the rearwardmost end of the release rod 56 extends rearwardly through a collet release drive plug 114 mounted in a bearing 116 in a plug housing 118 supported on the rear frame plate 60.

The connection between the collet assembly 80 and the remainder of the rotator assembly 22 comprises a pair of disc-like, C-shaped connectors, namely a forward connector 120 and a rearward connector 122 shown in FIGS. 2, 4, 5, 6 and 7. Considering first the forward connector 120 shown assembled in FIGS. 4 and 7, it interconnects the forwardmost end of the rotator spindle 54 and the rearwardmost end of the collet retainer 90. For this purpose, the forwardmost end of the rotator spindle 54 has a pair of transversely extending, flats or grooves 124 and 126 along its upper and lower margins and the rearwardmost end of the collet retainer 90 has a pair of transversely extending slots 128 and 130 aligned with the grooves 124 and 126, respectively. As is apparent, the forward connector 120 may be assembled in the grooves 124 and 126 and the slots 128 and 130 to retain the collet retainer 90 releasably fixed, both rotationally and axially, relative to the rotator spindle 54. When assembled, the forward C-shaped connector 120 is prevented from moving out of the grooves 124 and 126 and the slots 128 and 130 by a forward retaining sleeve 132 slidably mounted on the forward end 68 of the rotator spindle 54 between a retaining ring 134 trapped in a groove in the spindle 54 and the inner race 70 of the bearing 72. A spring 136 coiled about the forward portion of the rotator spindle 54 biases the retaining sleeve forwardly so that the C-shaped connector cannot accidentally become disengaged. The spring 136 may be relatively weak so that, for purposes of assembly and disassembly of the collet assembly 80 to the rotator spindle 54 may easily be accomplished by hand.

Considering now the rearward C-shaped connector 122, it is located in a groove 140 at the extreme rearward end of the collet release rod 56, and held against accidental removal by a rearward retaining sleeve 142 biased into covering relation thereto by a coil spring 144 wrapped around a rearwardly-extending shank portion 146 of the release drive plug 114. Accidental disassembly of the rearward retaining sleeve 142 is prevented by a retaining ring 148 lodged in a groove in the plug shank portion 146. Here it may be noted that, in the operation of the collet assembly 80, the spring washers 112 bias the collet actuator 94 against the rear cam surface 88 unless the collet release rod 56 is driven rearwardly by the release drive plug 114. The release plug 114 is in turn driven rearwardly in known fashion by dowel pins 150 held by a drive link 152 controlled by an collet release actuator motor 154 on the frame top plate 66.

With reference to FIGS. 1,2, and 4, the inner commutator shield assembly 24 of this invention comprises an inner shield 170 having notches 172 at its forward end for exposing commutator tangs as now well known in the art. The inner shield 170 is coaxial with and snugly surrounds the collet retainer 90 throughout substantially its entire length, and accordingly has an enlarged rear section 174 that receives the enlarged diameter rear portion 102 of the collet retainer 90. Bushings 176 pressed into the bore of the inner shield 170 provide a bearing between the collet retainer 90 and the inner shield 170 to permit the collet retainer 90 to freely rotate relative to the inner shield 170 when driven by the armature rotator motor 50.

The inner shield assembly 24 is connected to the front frame plate 58 by means permitting a quick change of the inner shield assembly 24. A transversely extending bracket plate 178 is welded to the inner shield 170 and connected to the front frame plate 58 by a quick release assembly 180. Quick release assembly 180 comprises a threaded stub shaft 182 threadedly engaged within a bore 184 in the front frame plate 58 and a quick release coupling 186 having a female connector part 190 and a male connector part 188 held together by ball elements (not shown) trapped in a spring biased connector sleeve 192. Here it may be observed that the outer shield assembly 26 has a similar quick release assembly 194 which will be described below. Quick release assembly 194 is shown in cross section in FIG. 3, and that cross section is representative of the corresponding parts of the inner shield quick release coupling 186.

The end of the male connector part 188 remote from the female connector part 190 extends through an arcuate bore 196 (FIG. 8) in the outer end of the transverse bracket plate 178. Arcuate bore 196 permits of a limited degree of movement of the inner shield 170 relative to the axis of the male connector part 188. This enables the machine manufacturer to accurately preset the rotary position of the inner shield 170, and the preset orientation is maintained by a clamping nut assembly 198.

Referring to FIGS. 1 through 4, the outer shield assembly 26 comprises a retractable outer shield 200 connected by a bracket plate 202 and a quick disconnect assembly 204 to the piston rod 206 of an air actuator cylinder 208. Quick disconnect assembly 204 includes a quick release coupling 210 comprising a female connector part 212 and a male connector part 214 held together by ball elements 215 trapped in a spring biased connector sleeve 216. The operation of quick release couplings are well known so no further discussion thereof is deemed necessary.

As will be understood by those familiar with the art, this invention enables a machine manufacturer to construct sets of tooling components comprising the quickly removable parts of the inner and outer shield assemblies and the modular collet assemblies. These sets can be tailored to fit individual armatures and enable the user of the machine to quickly change a machine over from the winding of armatures having one set of parameters to the winding of armatures having a different set of parameters. Because the tooling parts that are not quickly removable have a location fixed relative to the machine frame, the machine manufacturer can readily supply additional tooling sets to the user of the machine whenever needed.

Although the presently preferred embodiment of this invention has been described, it will be understood that within the purview of this invention various changes may be made within the scope of the appended claims.

We claim:

1. In a commutator shield assembly for a flier-type armature winder, said shield assembly being of the type comprising a shield movable in a linear direction along a predetermined axis, drive means including an actuator having a linearly movable output shaft for moving said shield along said axis, and connection means connecting said output shaft to said shield, the improvement wherein said connection means includes manually operable quick release coupling means releasably connecting said output shaft to said shield to enable manual disconnection of said shield from said output shaft so that said shield may be quickly removed and replaced without the use of tools.

2. The apparatus of claim 1 wherein said quick release coupling means comprises interfitting first and second connector parts, said first connector part being connected to said output shaft and said second connector part being connected to said outer sleeve, whereby said second connector part is removable and replaceable with said outer shield.

3. In a commutator shield assembly for a flier-type armature winder, said shield assembly being of the type comprising a shield movable in a linear direction along a predetermined axis; and drive means for moving said shield along said axis including a bracket connected to said shield, a drive link connected to said bracket, and shield actuating means connected to said drive link; the improvement wherein said drive link includes a first part connected to said drive means, a second part connected to said bracket, and manually operable quick release coupling means releasably connecting said first part and said second part to enable manual disconnection of said first part from said second part without the use of tools.

4. In a commutator shield assembly for a flier-type armature winder, said shield assembly being of the type comprising a shield and mounting means for mounting said shield on a fixed part of the winder, the improvement wherein said mounting means includes a pair of aligned shafts, means connecting one of said shafts to said fixed part and means connecting the other of said shafts in fixed relation to said shield, and manually operable quick release coupling means releasably connecting said one of said shafts to the other of said shafts to enable manual disconnection of said shafts from one another and thereby said shield from said fixed part so that said shield may be quickly removed and replaced without the use of tools.

5. In a flier-type armature winder of the type having a commutator shielding assembly comprising an inner shield assembly having an inner shield and inner shield mounting means for mounting said inner shield on a first fixed part of the winder, and an outer shield assembly having a movable outer shield, drive means for moving said outer shield including an outer shield actuator having a linearly movable output shaft and outer shield mounting means for mounting said outer shield actuator on a second fixed part of the winder; the improvement wherein said inner shield mounting means comprises a first manually operable quick release coupling means releasably connecting said inner shield assembly to said first fixed part and wherein said outer shield mounting means comprises second manually operable quick release coupling means releasably connecting said outer shield assembly to said output shaft so that said outer shield may be moved by operation of said actuator along a predetermined axis, and wherein said first quick release coupling means enables manual disconnection of said inner shield assembly from said first fixed part and said second quick release coupling means enables manual disconnection of said outer shield assembly from said output shaft so that said inner shield and said outer shield may be quickly removed and replaced without the use of tools.

6. In an armature winding machine having an armature rotator assembly with a motor-driven rotator spindle and a collet assembly comprising a collet having a shaft-gripping portion for gripping the shaft of an armature to be wound and camming surfaces for causing clamping pressure to be applied to an armature shaft, a tubular collet retainer having collet-operating surfaces against which sail camming surfaces bear, a collet actuator within said retainer, and collet operating means connected to said collet actuator including a rod extending completely through said rotator spindle for operating said collet, the improvement wherein: said collet assembly comprises an integral assembly including said collet, said collet retainer, said actuator, and said release rod; wherein first connector means is provided for releasably connecting said collet retainer to said rotator spindle; and wherein second connector means is provided for releasably connecting said release rod to said drive means rearwardly of said spindle so that said integral assembly may be disconnected from said rotator spindle and said drive means and removed as a unitary subassembly.

7. The apparatus of claim 6 wherein said first connector means comprises manually removable key means.

8. The apparatus of claim 6 wherein said second connector means comprises manually removable key means.

9. The apparatus of claim 6 wherein said first connector means and said second connector means each comprises manually removable key means.

10. In a flier-type armature winder of the type having: an armature rotator assembly comprising a rotator spindle and a collet assembly for gripping an armature shaft, said collet assembly including a collet retainer; an inner commutator shield assembly having an inner shield slidable over said collet retainer and inner shield mounting means for mounting said inner shield on a first fixed part of the winder; and an outer commutator shield assembly having an outer shield slidable over said inner shield, outer shield drive means including an actuator having a linearly driven output shaft, and outer shield mounting means for mounting said outer shield assembly on a second fixed part of the winder, the improvement wherein said inner shield mounting means comprises a first manually operable quick release coupling means releasably connecting said inner shield assembly to said first fixed part, wherein said outer shield mounting means comprises a second manually operable quick release coupling means releasably connecting said outer shield to said output shaft, and wherein said first quick release coupling means enables manual disconnection of said inner shield assembly from said fixed support means and said second quick release coupling means enables manual disconnection of said outer shield assembly from said output shaft so that said inner shield and said outer shield may be quickly removed and replaced without the use of tools.

11. In an armature winding machine having an armature rotator assembly with a motor-driven rotator spindle and a collet assembly comprising a collet having a shaft-gripping portion for gripping the shaft of an armature to be wound and camming surfaces for causing clamping pressure to be applied to an armature shaft, a tubular collet retainer having collet-operating surfaces against which said camming surfaces bear, a collet actuator within said retainer and collet operating means connected to said collet actuator for operating said collet assembly, the improvement wherein said collet retainer and said rotator spindle have cooperating key-receiving means for slidably receiving key means to retain them together; and wherein key means are provided slidably received by said key-retaining means for releasably connecting said collet retainer to said rotator spindle.

12. The improvement of claim 11 further comprising key-retaining means slidable on said collet retainer and said rotator spindle, and spring means biasing said key-retaining means into covering relation to said key means.

13. In a flier-type armature winder of the type having: an armature rotator assembly comprising a rotator spindle and a collet assembly for gripping an armature shaft, said collet assembly comprising a collet having a shaft-gripping portion for gripping the shaft of an armature to be wound located in a tubular collet retainer; an inner commutator shield assembly having an inner shield slidable over said collet retainer and inner shield mounting means for mounting said inner shield on a first fixed part of the winder; an outer commutator shield assembly having an outer shield slidable over said inner shield, outer shield drive means including an actuator having a linearly driven output shaft, and outer shield mounting means for mounting said outer shield assembly on a second fixed part of the winder; the improvement wherein: said inner shield mounting means comprises a first manually operable quick release coupling means releasably connecting said inner shield assembly to said first fixed part; wherein said outer shield mounting means comprises a second manually operable quick release coupling means releasably connecting said outer shield to said output shaft; wherein said first quick release coupling means enables manual disconnection of said inner shield assembly from said fixed support means and said second quick release coupling means enables manual disconnection of said outer shield assembly from said output shaft so that said inner shield and said outer shield may be quickly removed and replaced without the use of tools; wherein said collet retainer and said rotator spindle have cooperating key-receiving means for slidably receiving key means to retain them together; and wherein key means are provided slidably received by said key-retaining means for releasably connecting said collet retainer to said rotator spindle.

14. The improvement of claim 13 further comprising key-retaining means slidable on said collet retainer and said rotator spindle, and spring means biasing said key-retaining means into covering relation to said key means.

* * * * *

UNITED STATES PATENT AND TRADEMARK OFFICE
CERTIFICATE OF CORRECTION

PATENT NO. : 4,915,313

DATED : April 10, 1990

INVENTOR(S) : Alvin C. Banner, Philip C. Morgan, Ballard E. Walton

It is certified that error appears in the above-identified patent and that said Letters Patent is hereby corrected as shown below:

Column 7, line 23:
Claim 6, line 8, "sail" should be --said--.

Signed and Sealed this

Seventh Day of January, 1992

Attest:

HARRY F. MANBECK, JR.

*Attesting Officer*  *Commissioner of Patents and Trademarks*